United States Patent [19]

Menge

[11] 4,235,148
[45] Nov. 25, 1980

[54] CONNECTOR PLATE

[76] Inventor: Richard J. Menge, 4103 Anchor Dr., Brighton, Mich. 48116

[21] Appl. No.: 862,109

[22] Filed: Dec. 19, 1977

[51] Int. Cl.³ ............................................. E04C 3/292
[52] U.S. Cl. ......................................... 85/13; 52/712; 52/DIG. 6
[58] Field of Search ............... 85/13, 11; 52/712, 715, 52/DIG. 6

[56] References Cited

U.S. PATENT DOCUMENTS

| | | | |
|---|---|---|---|
| 3,241,424 | 3/1966 | Moehlenpah et al. | 85/11 X |
| 3,242,788 | 3/1966 | Broder | 85/13 |
| 3,498,170 | 3/1970 | Sanford | 85/13 |
| 3,603,197 | 9/1971 | Wood | 85/13 |
| 3,633,454 | 1/1972 | Schmitt et al. | 85/13 |
| 3,703,304 | 11/1972 | Losee | 85/13 X |
| 4,031,803 | 6/1977 | Jureit et al. | 85/13 |

Primary Examiner—Roy D. Frazier
Assistant Examiner—Peter A. Aschenbrenner
Attorney, Agent, or Firm—Gifford, VanOphem, Sheridan & Sprinkle

[57] ABSTRACT

An improved connector plate is provided for securing abutting wopden truss members to one another. The connector plate comprises a metal sheet and at least one pair of prongs integrally formed with the sheet by punching the prongs outwardly from the sheet. The prongs form an elongated slot in the sheet having a reduced central portion wherein the prongs break apart from each other at the reduced central portion of the slot when the prongs are punched to thereby form a relatively dull point for each prong.

3 Claims, 10 Drawing Figures

U.S. Patent    Nov. 25, 1980    Sheet 1 of 2    4,235,148
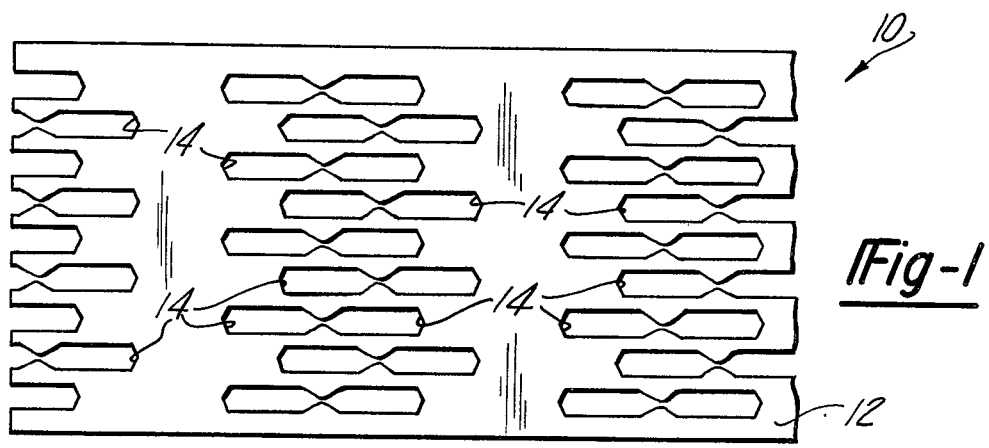
Fig-1
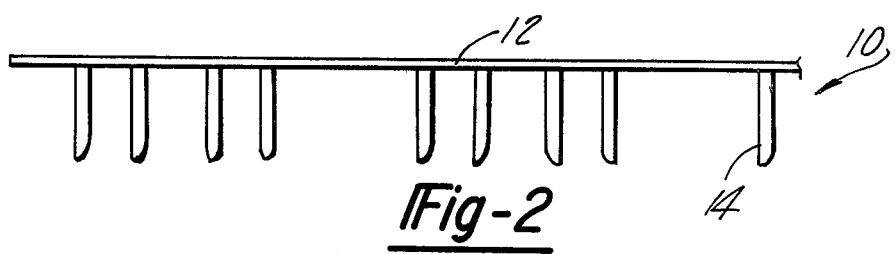
Fig-2
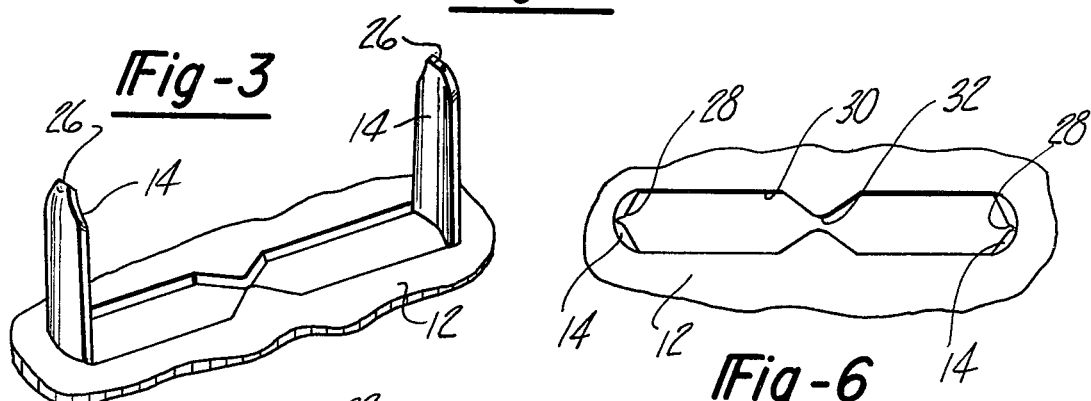
Fig-3
Fig-6
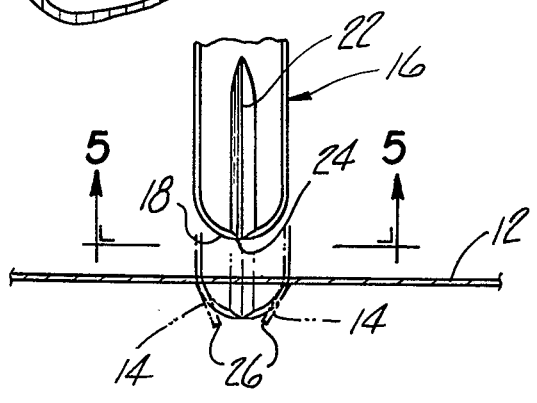
Fig-5
Fig-4

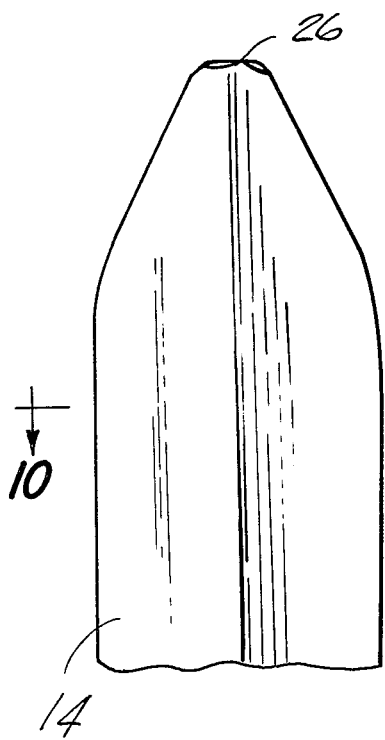
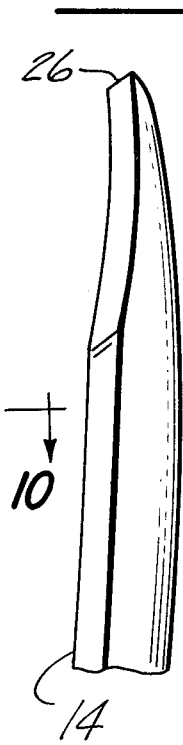
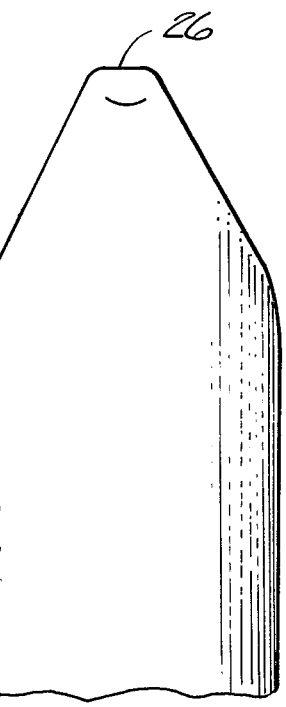
FIG-7    FIG-8    FIG-9
FIG-10

CONNECTOR PLATE

BACKGROUND OF THE INVENTION

I. Field of the Invention

The present invention relates to a connector plate for securing abutting wooden truss members together.

II. Description of the Prior Art

The use of nail connector plates for securing together abutting truss members is well known in the art. These previously known connector plates typically comprise a sheet of metal having a plurality of outwardly extending prongs formed on one side of the sheet which are hammered into the abutting truss members.

It has been the conventional practice with many of these previously known connector plates to nail the connector plate to the wooden truss elements after the insertion of the prongs into the truss elements. The nailed attachment of the connector plate to the truss elements prevents unintended detachment of the connector plate from the truss members. The nail attachment is disadvantageous, however, in that it requires additional materials, i.e. the nails, and is more time consuming to construct, and therefore, more expensive in labor costs.

Due to the disadvantages of nailing the connector plate to the truss element, there have been other previously known connector plates which are secured to the truss element only by hammering the prongs into the truss elements. These previously known connector plates, such as described in U.S. Pat. No. 3,603,197, issued Sept. 7, 1971, typically include a barb on each point prong which bites into the truss elements after insertion of the prongs. Connector plates of this type, however, are disadvantageous for a number of reasons.

First, due primarily to the sharp tip on each prong, after long usage the prongs tend to slide outwardly from their hole and away from the truss elements. This partial disengagement of the prongs from their respective holes greatly weakens the truss element joint.

The previously known connector plates of this type are also disadvantageous in that the connector plates are difficult to handle due to the sharply pointed end on the prongs. Injuries to workmen handling the connector plates is common in the trade, even when the workmen are wearing gloves.

Lastly, these previously known connector plates are disadvantageous in that a complex punch and die arrangement is required to produce the barbs on the prongs during the punching operation. Due to their resultant high cost, the required punch and die arrangements for these previously known connector plates unduly increases the overall cost for the individual connector plates.

SUMMARY OF THE PRESENT INVENTION

The connector plate of the present invention overcomes the above mentioned disadvantages of the previously known connector plates by providing a connector plate which is safe to handle, requires only a simple punch and die arrangement and can be securely attached to wooden truss elements without nails.

In brief, the connector plate of the present invention comprises a metal sheet having at least one pair of prongs integrally formed with the sheet by punching so that the prongs extend perpendicularly outwardly from one side of the sheet. The prongs are punched from the metal sheet so that they form an elongated slot in the sheet having a reduced central portion. Unlike the previously known nail connector plates, the prongs break apart from each other at the reduced central portion of the slot when the prongs are punched to thereby form a relatively dull point on each prong.

As will become hereinafter more clearly apparent, the relatively dull points on the prongs not only enable safe handling of the connector plates, but also firmly attach the connector plate to the truss elements during long usage. Moreover, a simple and inexpensive punch is used to punch the prongs from the metal sheet thereby decreasing the overall cost of the connector plate.

BRIEF DESCRIPTION OF THE DRAWINGS

A better understanding of the connector plate according to the present invention will be had upon reference to the following detailed description when read in conjunction with the accompanying drawing, wherein like reference characters refer to like parts throughout the several views, and in which:

FIG. 1 is a top plan view showing a connector plate according to the present invention;

FIG. 2 is a side plan view showing the connector plate according to the present invention;

FIG. 3 is a fragmentary perspective view illustrating two prongs of the connector plate according to the present invention and enlarged for clarity;

FIG. 4 is a fragmentary side plan view illustrating the method of manufacture of the prongs for the connector plate of the present invention;

FIG. 5 is a plan view taken substantially along line 5—5 in FIG. 4;

FIG. 6 is a top plan view showing one pair of prongs of the connector plate of the present invention and enlarged for clarity;

FIG. 7 is an enlarged view of the tip of a prong of FIG. 2 looking into the inboard face of the prong;

FIG. 8 is a side view of the tip of the prong of FIG. 2, magnified for clarity;

FIG. 9 is a rear view of the tip of a prong of FIG. 2; and

FIG. 10 is a cross-sectional view along line 10—10 of FIG. 7.

DETAILED DESCRIPTION OF THE PRESENT INVENTION

With reference first to FIGS. 1 and 2, a connector plate 10 according to the present invention is thereshown and comprises a sheet 12 of metal. A plurality of prongs 14 are integrally formed from the sheet 12 in a manner which will be subsequently described in greater detail such that the prongs 14 are substantially parallel to each other and perpendicular to the plane of the sheet 12.

With reference now to FIGS. 3-6, the prongs 14 are formed from the sheet 12 by a punch 16, best shown in FIGS. 4 and 5. The punch 16 has an arcuate punching end 18 which is tapered and generally V-shaped as shown at 20 about its entire outer periphery. In addition, the punch 16 is flat and includes a central, longitudinal V-shaped groove 22 formed on each of its sides. The combination of the tapered edge 20 with the V-shaped grooves 22 forms a substantially flat, reduced area portion 24 on the lowermost end of the punch 16. Moreover, it will be appreciated that the punch 16 is of relatively simple construction and, therefore, relatively inexpensive with respect to more complex punches.

With reference to FIG. 4, the punch 16 is moved from the position shown in solid line toward and through the sheet 12 as shown in phantom line in FIG. 4 to form the prongs 14 from the sheet 12. In doing so, the reduced area portion 24 on the lowermost end of the punch 16 first contacts the sheet 12 and, since the reduced area portion 24 is substantially flat, breaks apart the sheet 12 at the apices 26 of two prongs 14.

As the punch 16 moves through the sheet 12, the punch 16 bends the prongs 14 perpendicularly to the sheet 12 and substantially parallel to each other. Due to the V-shaped edge 20 along the sides of the punch 16, each prong includes a central longitudinal V-shaped groove 28 which face each other for each pair of formed prongs. In addition, each pair of prongs 14 forms an elongated slot 30 in the sheet 12 having a central reduced portion 32. The slot 30 corresponds to the cross-sectional shape of the punch 16 and, consequently, the reduced central portion 32 of the slot 30 corresponds substantially to the reduced area portion 24 of the punch 16.

Since the reduced area portion 24 of the punch 16 breaks apart the two prongs 14 formed during the punching operation, the broken ends 26 of the prongs 14 are relatively dull and jagged in comparison to other connector plates. Consequently, the connector plates 10 according to the present invention can be handled by workmen without the injuries common to the previously known connector plates.

The connector plate 10 according to the present invention is further advantageous in that the relatively dull broken ends 26 of the prongs 14 can be driven into and thereby secured to wooden truss elements (not shown) by simply hammering the connector plate 10 into the truss elements. No nails are required to ensure the attachment of the connector plate 10 to the truss elements.

Moreover, due to the relatively dull apex 26 on each prong 14, the prongs 14 tear, rather than cut, into the wood fibers when the connector plate 10 is hammered into the truss elements. The torn wood fibers are disordered and increase the frictional engagement of the prongs 14 with the truss elements. Thus, unlike the previously known connector plates with pointed prongs, upon insertion of the prongs 14 into the truss elements, the prongs 14 secure the connector plate 10 in place and without retraction of the connector plate 10 from the truss elements.

The present invention is further advantageous in that the punch 16 is relatively inexpensive with respect to the other more complex punches used for forming prongs on the previously known connector plates. Since the punches 16 become worn after repeated use, and some times even break, the relatively low cost of the punch 16 for forming the connector plate 10 according to the present invention effectively reduces the manufacturing cost of the instant connector plate 10.

Having described my invention, however, many modifications thereto will become apparent to those skilled in the art to which it pertains without deviation from the spirit of the invention as defined by the scope of the appended claims.

I claim:

1. A connector plate comprising:
   a metal sheet, and
   at least one pair of prongs integrally formed with said sheet by punching said prongs from said sheet so that said prongs are substantially parallel to each other and substantially perpendicular from said plate and so that the displacement of said prongs forms an elongated slot in said sheet, said slot having a tapering reduced central portion, and wherein said prongs have tapering necked-down, torn tips formed by breaking apart from each other at the narrowest point of the tapering reduced central portion of the slot when the prongs are punched from the sheet to thereby form a dull point on each prong,
   whereby said connector plate may be handled without injury and whereby said connector plate will firmly attach to a wooden truss element for long periods of time.

2. The invention as defined in claim 1 wherein said prongs are formed by forcing a punch having a reduced area portion on the portion of the punch which first contacts the sheet through the metal sheet, said reduced area portion of the punch being substantially flat and corresponding in shape to the reduced and central portion of the slot.

3. The invention as defined in claim 1 wherein said prongs are V-shaped in cross section.

* * * * *